United States Patent [19]

Gesing et al.

[11] Patent Number: 4,500,643

[45] Date of Patent: Feb. 19, 1985

[54] SHAPED REFRACTORY METAL BORIDE ARTICLES AND METHOD OF MAKING THEM

[75] Inventors: Adam J. Gesing; Graham Stratford, both of Kingston, Canada

[73] Assignee: Alcan International Limited, Montreal, Canada

[21] Appl. No.: 565,622

[22] Filed: Dec. 27, 1983

[30] Foreign Application Priority Data

Dec. 30, 1982 [GB] United Kingdom ............... 8236995

[51] Int. Cl. .............................................. C04H 35/58
[52] U.S. Cl. ........................................ 501/96; 501/98
[58] Field of Search ................................... 501/96, 98

[56] References Cited

U.S. PATENT DOCUMENTS 4,108,670 8/1978 Steiger et al. ..................... 501/96

Primary Examiner—James Poer
Attorney, Agent, or Firm—Cooper, Dunham, Clark, Griffin & Moran

[57] ABSTRACT

A shaped refractory article of titanium diboride or other metal has a microstructure with a weight average grain diameter of from 0.5 to 5 microns and substantially no grains larger than 10 microns diameter, from 10% to 45% by volume being made up of interconnected pores the majority having a diameter not substantially greater than 5 microns, porosity and grain size being substantially uniform throughout the microstructure, the article containing not more than about 0.2% by weight of oxygen and not more than about 0.5% by weight of carbon. The article may include inert particulate material in a matrix of the porous metal boride.

The article may be formed by forming a uniformly mixed body of reactants into shaped compacts and heating the compacts to cause evolution of carbon monoxide and formation of a coherent reaction sintered product. Numerous reaction schemes are given, but the following are preferred:

$$2TiO_2 + B_4C + 3C \rightarrow 2TiB_2 + 4CO \quad (1)$$

$$TiO_2 + B_2O_3 + 5C \rightarrow TiB_2 + 5CO \quad (2)$$

18 Claims, 1 Drawing Figure

SHAPED REFRACTORY METAL BORIDE ARTICLES AND METHOD OF MAKING THEM

BACKGROUND

This invention relates to shaped refractory metal boride articles. An important metal boride is titanium diboride $TiB_2$, which has been proposed for use in electrolytic aluminium reduction cells on account of its electrical conductivity and resistance to corrosion, and of the fact that it is wetted by molten aluminium metal but not by molten cryolite. But the invention is applicable also to other refractory metal borides.

Shaped articles of titanium diboride are conventionally produced by hot pressing titanium diboride powder or cold pressing followed by sintering. These operations are labour and energy intensive, and the sintering requires temperatures in excess of 2000° C.

One way of making titanium diboride powder is by briquetting boron carbide $B_4C$, carbon, and rutile titanium dioxide $TiO_2$ into pellets and heating to form titanium diboride. The reacted pellets are then ground and the resulting powder shaped and sintered. Since titanium diboride is a very hard metal, grinding is an expensive operation and introduces impurities from the grinding media and the atmosphere. Further impurities are introduced during powder handling, pressing and sintering operations. During sintering, the titanium diboride grain size grows, typically to the 50-100 micron range. By reason of this coarse grain structure and of the impurities, the shaped sintered products are subject to grain boundary attack, cracking, corrosion and disintegration when exposed to the sort of conditions that are found in electrolytic aluminium reduction cells.

U.S. Pat. No. 4,108,670 describes a titanium diboride article in the form of a dense matrix having a grain size of 1-20 microns and having from 5-50% by volume of large pores from 4-1000 microns diameter, many of which are isolated. The article is made by sintering from titanium boride formed as a sub-micron powder, so the need for grinding is avoided. But the powder handling, pressing and sintering operations necessarily introduce impurities. In particular, the article contains 0.1-5% by weight of carbon, added as a sintering aid. However, the presence of free carbon is disadvantgeous because it reacts to form $Al_4C_3$ and the associated volume expansion causes cracking.

SUMMARY OF INVENTION

It has now been found that pure, fine grain titanium diboride is substantially resistant to attack under the conditions normally encountered in electrolytic aluminium reduction cells. But the presence of even small quantities of impurities, particularly oxides or metals, causes drastic grain boundary attack and sample disintegration.

In one aspect, this invention provides a shaped refractory article of a group IV b, V b, or VI b metal boride, which article has a microstructure with a weight average grain diameter of from 0.5 to 5 microns and substantially no grains larger than 10 microns diameter, from 10% to 45% by volume being made up of interconnected pores the majority having a diameter not substantially greater than 5 microns, porosity and grain size being substantially uniform throughout the microstructure, the article containing not more than about 0.2% by weight of oxygen and not more than about 0.5% by weight of carbon.

In another aspect, the invention provides a shaped refractory composite of an inert particulate material in a matrix of a group IV b, V b or VI b metal boride, which matrix has a microstructure with a weight average grain diameter of from 0.5 to 5 microns and substantially no grains larger than 10 microns diameter, from 10 to 45% by volume being made up of interconnected pores of which the majority have a diameter not substantially greater than 5 microns, porosity and a grain size being substantially uniform throughout the microstructure, the matrix containing not more than about 0.2% by weight of oxygen and not more than about 0.5% by weight of carbon.

The inert particulate material may be for example $TiB_2$, $Al_2O_3$, AlON, AlN or an oxide, carbide of nitride of Al, Si or a transition metal. A combination of the latter compounds can be either two discrete phases (e.g. a boride and a carbide) or a single complex phase (e.g. a borocarbide). For cathode applications in electrolytic aluminium reduction cells, $TiB_2$, $Al_2O_3$, AlON and AlN are particularly suitable. The inert material particle size is not critical. In particular, it can be quite coarse relative to the grain size of the matrix.

The sizes of the pores and grains are estimated from the micrographs of the metallographic sections by standard linear intercept methods. The relative amount of open porosity is determined by mercury porosimetry from the difference between the bulk, and the "real" density. The amount of closed porosity is estimated from the difference between the "real" and "X-ray" density of the $TiB_2$ crystal. Mercury porosimetry also gives information on the size distribution of the open porosity of the sample.

In yet another aspect, this invention provides a method of making a shaped refractory article of a group IV b, V b or VI b metal boride, or a refractory shaped composite of an inert particulate material in a matrix of the metal boride, which method comprises forming a uniformly mixed body of reactants containing the said metal as an oxide sub-oxide, borate or carbide, boron as an element, oxide or carbide, and if necessary carbon in the stoichiometric proportions desired to form the desired metal boride, boron suboxides and carbon monoxide, forming the reaction mixture optionally together with an inert particulate material or a precursor thereof into a shaped compact, and heating the shaped compact in an inert atmosphere to form a reaction sintered product.

In this method, the step of forming a uniformly mixed body of the reactants is crucial. if the mixture is not uniform then local concentrations of unreacted oxide or carbon or carbide in the reaction sintered product will give rise to drastic attack by molten aluminium or molten cryolite and sample disintegration. A preferred method of forming a uniform mixture of the reactants is by precipitation of one or more of them from solution in the presence of the others.

A paper by Rafaniello W., Cho K., and Virkar A. V., J. Mater. Sci., 16 (1981) pages 3479-3488, describes the formation of a uniform mixture of $SiO_2$, $Al_2O_3$ and C, for the fabrication of SiC-AlN alloys, by precipitating aluminium hydroxide on to a mixture of starch and silica. But the paper is not concerned with borides; and the product is obtained as a powder rather than as a coherent reaction sintered body.

THE ARTICLE

While titanium diboride is the preferred material, other refractory group IV b, V B, or VI b metal borides may be used, for example those of zirconium, niobium, hafnium, vanadium, tantalum or chromium, and mixtures and alloys thereof. (These groups are as shown in the Periodic Table on the inside front cover of 59th Edition (1978-9) of the Handbook of Chemistry and Physics.)

The metal boride has a microstructure with a grain size of up to about 10 microns, and a weight average of about 0.5-5 microns. With larger grain size, such as is found in products sintered at 2000° C., microcracking occurs, and the product may have reduced resistance to corrosive attack.

From 10-45%, preferably from 20-40%, desirably from 25-35% of the volume of the article is made up of interconnected pores. The majority have a diameter not substantially greater than 5 microns, although a small number of larger pores or voids may be present.

The pores are preferably all interconnected, although some closed pores may be present. A finely distributed system of connected pores leads to a thermally shock resistant structure. When the article is immersed in molten aluminium, the highly conductive metal infiltrates the connected pore system, so that the effective electrical conductivity is better than that of a solid nonporous compact.

A porous article has the further advantage over a solid one that less material is required to fill a given volume. For example, while the density of solid nonporous titanium diboride is about 4.5, the density of the porous titanium diboride articles of this invention is preferably from 2.5-4.0, optimally 2.9-3.4, mg/mm$^3$.

To achieve good resistance to corrosive attack, it is important that impurities should be kept at a low level. The oxygen content is not greater than about 0.2% preferably below 0.1%. The carbon content is not greater than about 0.5%, preferably below 0.2%. The nitrogen content is preferably below 0.2%. The iron, silicon and aluminium contents are preferably each below 0.03%. The content of all impurity cations together is preferably below 0.1%. All these percentages are by weight on the weight of the article.

THE METHOD

There are various chemical reactions by which metal oxides, borates or carbides and boron oxides or carbides can be reacted possibly with excess carbon to form reaction sintered metal diboride articles according to the invention, of which the following seven are examples.

These are written in terms of titanium, but corresponding reaction schemes can be written for the other metals envisaged.

$$2TiO_2 + B_4C + 3C \rightarrow 2TiB_2 + 4CO \quad (1)$$

$$TiO_2 + B_2O_3 + 5C \rightarrow TiB_2 + 5CO \quad (2)$$

$$TiC + B_2O_3 + 2C \rightarrow TiB_2 + 3CO \quad (3)$$

$$TiO_2 + TiC + B_4C \rightarrow 2TiB_2 + 2CO \quad (4)$$

$$3B_2O_3 + 7TiC + 2B_4C \rightarrow 7TiB_2 + 9CO \quad (5)$$

$$TiO_2 + 4B \rightarrow TiB_2 + B_2O_2 \quad (6)$$

$$4TiBO_3 + B_4C + 11C \rightarrow 4TiB_2 + 12CO \quad (7)$$

When TiO$_2$ is heated with B$_4$C and/or C, it has been found that at low temperatures (below 650° C.) intermediate reactions take place producing titanium borate TiBO$_3$ and/or titanium suboxides. These materials form an ideal precursor for the reaction sintering of the TiB$_2$. Titanium borate gives an intimate mixture of titanium and boron on an atomistic scale; whereas, titanium suboxides are already partially-reduced titanium species so that the amount of the CO evolution in the final reaction sintering process is markedly reduced. Stable titanium suboxide species include Ti$_2$O$_3$, TiO and Ti$_2$O. The following reactions illustrate the reduction in CO evolution when utilizing the different titanium suboxide precursors.

$$TiO_2 + B_2O_3 + 5C \rightarrow TiB_2 + 5CO \quad (2)$$

$$TiBO_3 + \tfrac{1}{4}B_4C + 11/4C \rightarrow TiB_2 + 3CO \quad (7)$$

$$TiO_2 + \tfrac{1}{2}B_4C + 3/2C \rightarrow TiB_2 + 2CO \quad (1)$$

$$\tfrac{1}{3}Ti_3O_5 + \tfrac{1}{2}B_4C + 7/6C \rightarrow TiB_2 + 5/3CO \quad (8)$$

$$\tfrac{1}{2}Ti_2O_3 + \tfrac{1}{2}B_4C + C \rightarrow TiB_2 + 1\tfrac{1}{2}CO \quad (9)$$

$$TiO + \tfrac{1}{2}B_4C + \tfrac{1}{2}C \rightarrow TiB_2 + 1CO \quad (10)$$

$$\tfrac{1}{2}Ti_2O + \tfrac{1}{2}B_4C \rightarrow TiB_2 + \tfrac{1}{2}CO \quad (11)$$

The suboxide powders can be produced in a separate carbothermic reduction step according to the following equations.

$$TiO_2 + \tfrac{1}{2}B_2O_3 + C \rightarrow TiBO_3 + 2CO \quad (12)$$

$$TiO_2 + \tfrac{2}{3}C \rightarrow \tfrac{1}{3}Ti_3O_5 + \tfrac{2}{3}CO \quad (13)$$

$$TiO_2 + \tfrac{1}{2}C \rightarrow \tfrac{1}{2}Ti_2O_3 + \tfrac{1}{2}CO \quad (14)$$

$$TiO_2 + C \rightarrow TiO + CO \quad (15)$$

$$TiO_2 + 1\tfrac{1}{2}C \rightarrow \tfrac{1}{2}Ti_2O + 1\tfrac{1}{2}CO \quad (16)$$

In an experiment, TiO$_2$ was precipitated onto boron carbide powder from a TiCl$_4$ aqueous solution by lowering the pH with ammonium hydroxide. The product obtained was hydrated anatase, boron carbide and ammonium chloride. The product was then heated under flowing argon to 650° C. in slightly reduced pressure. The product contained, as major phases, titanium borate (TiBO$_3$), titanium suboxide (Ti$_2$O$_3$) as well as minor proportions of boron carbide and carbon.

Three methods of carrying out the reaction schemes will now be described.

A. One method of carrying out reaction schemes (1) to (7) is to mix the reactants in the required proportions, form the mixture into shaped compacts by pressing or pelletizing, and heating the compacts in an inert atmosphere until carbon monoxide evolution takes place and a porous reaction sintered product is formed.

One disadvantage of this one-step method is the rather large volume of carbon monoxide evolved, which tends to result in a product of rather higher porosity and lower strength than may be desired. This is particularly true of reaction scheme (2), where 5 moles of CO are generated per mole of TiB$_2$. Reaction scheme (1) is superior, since it results in the production of only 2 moles of CO per mole of TiB$_2$. On other grounds, however, reaction scheme (2) would be preferred, since it makes use of the cheapest and purest precursors available.

B. A preferred method of carrying out reaction schemes (1) to (5) is thus to heat the powdered reactants in the required stoichiometric proportions in a vacuum or under an inert atmosphere at a temperature below which the formation of the titanium diboride takes place. This allows for the evolution of most of the carbon dioxide and for the formation of the intermediate suboxide and borate precursor species. This powder is then ground, homogenized, formed into green shapes by either pressing or pelletizing and is reacted in a second step to give the final $TiB_2$ poduct. This method results in two advantages over the one-step method A:

(i) Regrinding the intermediate reaction product improves control of the microstructure and physical properties in a way that is not possible with the one-step method;

(ii) The initial step results in evolution of part of the carbon monoxide gas. There is thus less gas evolution during the final reaction sintering step, resulting in a product having lower porosity.

C. In another preferred method, titanium dioxide is mixed with carbon in proportions as required for one of reaction schemes (13) to (16), and the mixture is heated to form a titanium sub-oxide. This is then mixed with $B_4C$ and C in proportions as required for one of reaction schemes (8) to (11). The mixture is formed into shaped compacts and heated to effect reaction sintering.

As compared to the one-step method A, this method has both the advantages (i) and (ii) noted above, and also a third advantage:

(iii) The second stage reaction goes at a lower reaction temperature, because the titanium sub-oxides are less stable than titanium dioxide. As a result, the titanium diboride product has a smaller grain size.

The first step of the method is to form a homogeneous reaction mixture containing the ingredients in the stoichiometric proportions required for one of the above reaction schemes (or some other chosen reaction scheme). One method of doing this is to thoroughly and intimately mix the powdered ingredients, for example in a cemented carbide or elastomer-lined ball mill using titanium diboride or boron carbide grinding media to avoid contamination. It is an advantage of the method that the reactants are stable in moist air at ambient temperature, so that special precautions to protect them from the atmosphere are not needed.

A preferred method of preparing the uniformly mixed body of reactants involves precipitating one reactant on to a dispersion of another, or coprecipitating two or more of the reactants. The step is preferably carried out in an aqueous medium, and without the use of any non-volatile precipitant which might contaminate the reaction sintered product.

For reaction scheme (1) above, a first step is to prepare an aqueous medium containing titanium in solution. Preferably an aqueous solution of titanium halide is prepared directly. Titanium tetrachloride is the preferred halide. However, $TiCl_4$ is difficult to handle because of its volatility and propensity to hydrolysis. Therefore an aqueous solution of $TiCl_3$ may be used with addition of a strong oxidising agent such as hydrogen peroxide. Titanium chloride is commercially produced by chlorination of ilmenite ore in the production of rutile pigments. The off gases of the chlorination may be scrubbed in a wet acid scrubber to produce an aqueous solution containing titanium.

The aqueous solution is mixed with the required amount of carbon black or a carbon precursor such as a hydrocarbon or a carbohydrate, e.g. starch, together with boron carbide as a paste with water. Dispersion of fine carbon or carbide powder in an aqueous solution, enables the second component to be precipitated onto the suspended crystalites. This method is particularly effective because the suspended crystalites act as nuclei for precipitation and crystal growth. $Ti^{+4}$ may be precipitated by changing the pH, for example with ammonium hydroxide to produce titanium hydroxide and ammonium chloride. The precipitate is then dried in air and heated to more than 600° C. in flowing nitrogen to drive off the ammonium chloride and water of hydration.

Alternatively the aqueous solution can be dried to produce an oxychloride precipitate and then pyrohydrolysed with steam to remove hydrogen chloride, resulting in the production of titanium hydroxide.

In a further variation of the procedure pure $TiCl_4$ liquid is diluted with a non-aqueous solvent to facilitate handling of the liquid in air and to moderate the rate of hydrolysis reaction. Hydrocarbon and chlorinated or fluorinated hydrocarbons are suitable. Use of carbon tetrachloride was found to be particularly advantageous due to its similar molecule structure to $TiCl_4$. $TiCl_4$ is soluble in $CCl_4$ and does not react chemically with it. $CCl_4$ is non-hydrophilic and hence protects $TiCl_4$ from atmospheric moisture. $CCl_4$ is further non-flammable and yet sufficiently volatile to be conveniently removed and recovered by distillation.

Boron carbide and carbon black powders are suspended in $TiCl_4$—$CCl_4$ solution. Aqueous ammonium hydroxide is added to precipitate the titanium hydroxide on the $B_4C$ and carbon. The precipitate is allowed to settle and excess $CCl_4$ is decanted from the system. $CCl_4$ is further distilled from the remaining slurry leaving a dry precursor mixture.

A dry precursor powder is obtained by heating in flowing nitrogen to 600° C., and ball milling the powder. The powder may be pre-heated, as described above, to generate some of the CO (but without formation of $TiB_2$) and again ground and homogenised. It is then formed into shaped green compacts for reaction sintering by pressing, extruding, briquetting or pelletizing operations.

The resulting compact contains an intimate, very reactive mixture of reactants distributed uniformly on a microscopic scale. The shape is then reaction sintered in vacuum or an inert atmosphere, e.g. of flowing argon, at a temperature of at least 1300° C. for a time to effect essentially complete reaction. Vacuum processing is preferred because it facilitates removal of the gaseous reaction products and promotes the completion of the reaction. Higher temperatures up to 2100° C. may be desirable in the later stages of heating in order to volatilise any residual boron oxide and thus reduce the residual oxygen content, and promote more complete sintering of the body.

Discs, spheres, cylinders and other shapes can be formed by this technique. The maximum size of the shape is limited only by the need for carbon monoxide evolution from the interior. The extent of the porosity is determined by the amount of carbon monoxide and the rate at which it is evolved. It is surprising that the compact does not disintegrate as a result of the substantial evolution of gas.

For reaction scheme 2, the preferred starting materials are the aforementioned aqueous solution containing titanium, a boric acid solution and carbon black or a carbon precursor. The solubility of boric oxide is greater in a basic or neutral solution, hence co-precipitation of $TiO_2$ and $H_3BO_3$ can be accomplished by mixing an acidic $TiCl_3$—$H_2O_2$ solution with a basic solution of $H_3BO_3$ and ammonium hydroxide.

Alternatively, carbon black, $H_3BO_3$ and/or $TiO_2$ can be suspended in the aqueous solution and serve as nuclei for precipitation of the remaining components. The resulting mixture of reagents is dried and ball milled. As noted above, an optional but preferred step is to preheat the powder to a temperature to generate some of the CO (but without formation of $TiB_2$), followed by further ball milling. The powder mixture is then formed into shaped green compacts and subjected to reaction sintering as before. Since the thermodynamic equilibrium temperature for reaction 2 is higher than for reaction 1 (1014° C.) reaction sintering temperature will be correspondingly higher.

For reaction scheme (3), the starting material is an aqueous solution of boron containing a dispersion of finely divided titanium carbide and a carbon precursor. This reaction scheme has the advantage over (1) that titanium carbide is less hard and more easily pulverised than boron carbide.

For reaction scheme (4), the starting material is an aqueous solution of titanium containing a dispersion of finely divided titanium carbide and boron carbide. For reaction scheme (5), the starting material is an aqueous solution of boron containing a dispersion of finely divided titanium carbide and boron carbide. These two reaction schemes have the advantage over the others that a separate carbon precursor is not required. Also, the carbon monoxide evolution is reduced.

In the reaction scheme (6), boron metal is used as the reducing agent to produce $TiB_2$ and volatile boron suboxides. This is a well-known route for the preparation of high purity $TiB_2$ powder on a laboratory scale. It is not economical on an industrial scale due to excessive consumption of boron metal.

However, it is possible to use a combination of scheme (6) and any one of (1)–(5) in order to be able to produce an essentially carbon-free $TiB_2$ body. In the reaction scheme (6), the starting material is an aqueous solution of titanium containing a dispersion of finely divided boron metal.

In the foregoing reaction schemes, alternative titanium and boron salts such as, $BCl_3$, $NaBCl_4$, $KBCl_4$, $NaBF_4$, $KBF_4$, $Na_2TiCl_6$, $K_2TiCl_6$, $Na_2TiF_6$ or $K_2TiF_6$ may be dissolved to produce an aqueous acid solution. As yet a further alternative, titanium and boron organometallic compounds may be used as precursors and hydrolysed to prepare the solution. Another possible reaction precursor is described in U.S. patent application Ser. No. 454,718 filed on 30th Dec. 1982, and is a glass or microcrystalline gel having a grain size up to 200 A, produced by hydrolysis of an organic solution of the metal followed by drying/gelling.

The method of the invention has the following advantages:

(a) Process steps such as grinding, forming and sintering of boride powders are eliminated, resulting in substantial cost reductions.

(b) Powders are used as starting materials for reaction sintering which are inert at ambient temperature in moist air; hence precautions usually taken to avoid oxygen contamination of very reactive boride powders are unnecessary.

(c) High purity material is produced which leads to improved corrosion resistance, in spite of the large amount of porosity present. Impurities which would be introduced by grinding borides are absent.

(d) Improved precursor preparation and homogenisation permits the forming of reaction sintered shapes of larger size and better mechanical properties, and increases the uniformity of the corrosion resistance.

The accompanying drawing is a microphotograph of a slice of a product according to this invention, taken at a magnification of approximately 2300 diameters. The white bars along the left hand end of the photograph represent a length of 10 microns. The uniform grain size, and the size and extent of the pores, are clearly visible.

The following Examples illustrate the invention.

EXAMPLE 1

Precipitation of $H_3BO_3$ from an aqueous solution.

The solubility of $H_3BO_3$ as a function of pH and temperature was studied. A series of saturated solutions at various pH's was prepared and sampled. Samples were analysed for $H_3BO_3$ content at both room and elevated temperature.

Results are presented in Tables 1 and 2 below:

TABLE 1

| SOLUBILITY IN g $H_3BO_3$ per 1 SOLUTION @ 20° C. | |
|---|---|
| pH | Concentration of $H_3BO_3$ |
| 3.82 | 47.6 |
| 4.97 | 47.6 |
| 4.96 | 48.8 |
| 5.94 | 58.1 |
| 6.03 | 60.0 |
| 6.03 | 61.8 |
| 6.28 | 74.8 |
| 6.50 | 80.3 |
| 6.82 | 111 |
| 6.82 | 111 |
| 7.38 | 115 |
| 7.55 | 124 |
| 7.84 | 154 |
| 8.05 | 172 |
| 8.20 | 201 |

TABLE 2

| SOLUBILITY OF $H_3BO_3$ AS A FUNCTION pH AND TEMPERATURE | | |
|---|---|---|
| pH | Solubility (g/l) @ 20° C. | Solubility (g/l) @ 72° C. |
| 2.62 | 47 | 168 |
| 6.58 | 88 | 411 |

It is evident that by appropriate adjustment of pH using $NH_4OH$ substantial quantities of $H_3BO_3$ can be dissolved in aqueous solution to be precipitated out again as desired by subsequent lowering of pH using HCl. By increasing the temperature of the solution even higher loadings of $H_3BO_3$ can be achieved. It is also possible to precipitate $H_3BO_3$ by simply cooling at a fixed pH thereby reducing the volume of solution required.

EXAMPLE 2

Precipitation of $Ti^{+4}$ specieis from $TiCl_3$ solution.

Oxidation of $Ti^{+3}$ to $Ti^{+4}$ was accomplished by use of a 30% $H_2O_2$ solution followed by addition of $NH_4OH$ to precipitate $Ti(OH)_4$. Precipitates were decanted, air dried on a hot plate or in an oven at 80°–90° C. and ground in a standard mortar and pestle.

Procedure was as follows:

1. Hold temperature within the 40°–45° C. range.
2. Oxidize $Ti^{+3}$ to $Ti^{+4}$ in a 20% solution of $TiCl_3$ by dropwise addition to a stoichiometric quantity of 30% $H_2O_2$ solution.
3. Form a white gel by the slow addition of $NH_4OH$ in a quantity in slight excess to that required to precipitate all of the Ti present. $TiO_2$ was obtained from the above prepared precipitate by:
4. Decanting any free supernatant.
5. Spreading the precipitate on a flat dish.
6. Drying in air for at least two hours at 80° to 90° C.
7. Roasting in air to approximately 600° C. in an alumina or procelain boat to drive off $NH_4Cl$.

Result

The produce was confirmed by X-ray diffraction to be $TiO_2$.

EXAMPLE 3

The test of Example 2 were used as a basis for preparation of mix according to reaction scheme (1).

| Procedure Chemicals and Quantities used | | |
| --- | --- | --- |
| $TiCl_3$ | 20% Solution | 10.0 ml |
| $H_2O_2$ | 30% Solution | 6.30 ml |
| $B_4C$ - 325 Mesh | | 0.33 g |
| Cane Sugar | | 0.56 g |
| 10 M $NH_4OH$ | | 10.0 ml initially + 15 ml |
| Concentrated HCl | | as required |

Mixing

1. $TiCl_3$ was slowly added to $H_2O_2$ held at 40° to 45° C.
2. The sugar and 10 ml of $NH_4OH$ were mixed then added to the oxidized Ti solution. The mixture was left to react for 1 hour.
3. A $B_4C$/water paste was mixed into the suspension.
4. $NH_4OH$ was added in an attempt to coagulate. After 15 ml had been added this was stopped. The pH at this point was 9.
5. The pH was dropped to 6 with concentration HCl. A thick grey suspension resulted.
6. The product was left overnight.
7. A small quantity of supernatant was drawn off.
8. The solids were placed into a petri-dish and dried on a hot plate for 2 hours.

Results

Analysis of the supernatant liquor showed this to be essentially an aqueous solution of ammonium chloride, Ti-free thus confirming that the desired reaction had proceeded to completion.

EXAMPLE 4

The tests of Examples 1 and 2 were used as a basis for preparation of mix according to reaction scheme (2).

| Procedure Chemicals and Quantities used | |
| --- | --- |
| $TiCl_3$ 20% Solution | 10.0 ml |
| $H_3BO_3$ | 1.61 g |
| $H_2O_2$ 30% Solution | 6.3 ml |
| 10 M $NH_4OH$ | 10 ml initially + 3 ml |
| Cane Sugar | 1.86 g |

Mixing

1. $TiCl_3$ was slowly added to $H_2O_2$ in a temperature-controlled beaker held at 20° to 25° C. The mixing rate was regulated to prevent undue frothing.
2. $H_3BO_3$, sugar and 10 ml $NH_4OH$ were premixed at room temperature.
3. The above mixture was added to the oxidized Ti solution.
4. The temperature as raised to 47° C. and the mixture was left to react for 1 hour with stirring.
5. Approximately 3 ml more 10M $NH_4OH$ was added to form a thin jelly with very little free liquid.
6. The product was spread in a petri-dish and placed in the oven to dry overnight at 80° to 90° C.

Results

Analysis of the supernatant liquor showed this to be essentially an aqueous solution of ammonium chloride, Ti and B-free, thus confirming that the desired reactions had proceeded to completion.

EXAMPLE 5

A 200 g batch of powders was prepared containing 63.7 wt. % $TiO_2$ 22.0 wt.% $B_4C$, 14.3 wt.%C. The powders were mixed for one hour in a ball mill, using a 20:1 charge to batch weight ratio. The ball mill was half full and the charge was covered with isopropyl alcohol.

Cemented carbide or elastomer-lined mills and $TiB_2$ grinding media are preferred so that contamination is avoided.

One inch diameter, quarter inch thick discs were dry pressed at 67 MPa pressure. On a commercial scale, either pressing briquetting, disk pelletizing, slip casting or extrusion can be used to form the shapes. Carbowax or a methyl cellulose binder would be used and would be added at a level of 1–5 wt.% of the batch prior to ball milling.

The reaction according to reaction scheme (1) was carried out in a vacuum by holding the compacts at a pre-set temperature for a period of 4 hours. It was found that compacts reaction sintered to form strong, uncracked $TiB_2$ compacts at a temperature between 1000° and 1400° C. The microstructure of the compacts consisted of a rather uniform fine sponge-like structure of titanium diboride grains less than 4 microns diameter, interspersed by interconnected pores generally also less than 5 microns diameter. The overall porosity was less than 45%. Below 1000° C. intermediate species of $Ti_2O_3$ and $TiBO_3$ were formed. Oxygen contamination is mainly in the form of $Al_2O_3$ from the grinding media. There is a marked reduction of the contamination at 1500° and 1600° C. This is due to the reduction of $Al_2O_3$ and $B_2O_3$ and their evolution as sub-oxides.

EXAMPLE 6

Titanium oxide, boron carbide and carbon were mixed in proportions for reaction scheme (7) in a vee blender. The mixture was formed into pellet-shaped compacts, ranging in size from 5 to 10 mm diameter, by disc agglomeration. The compacts were fired in vacuum at about 1700° C. for about 2 hours.

but the product contained instead Ti$_2$O$_3$, TiO and TiC.

TABLE 3

| Reaction | Wt. of TiO$_2$ g | Wt. of Carbon g | Green Density g/cm$^3$ | Baked Density g/cm$^3$ | Vol. Shrinkage percent | Wt. Loss percent | Phases produced in order of abundance. |
| --- | --- | --- | --- | --- | --- | --- | --- |
| 13 | 28.6 | 1.40 | 1.76 | Powder | — | — | Ti$_2$O$_3$ |
| 14 | 27.91 | 2.09 | 1.98 | 2.97 | 46 | 18 | Ti$_3$O$_5$ |
| 15 | 26.07 | 3.92 | 2.01 | 2.74 | 47 | 27 | Ti$_2$O$_3$ <br> TiO |
| 16 | 24.52 | 5.51 | 1.98 | 1.60 | 33 | 46 | Ti$_2$O$_3$ <br> TiO <br> TiC |

The resulting pellets were hard and strong and had an oxygen content of 0.2% and a carbon content of 0.4%. The microstructure of the reaction sintered pellets consisted of a very fine, sponge-like structure of titanium diboride grains. The grains were between 1 and 10 microns in diameter. The pores were approximately the same size as the grains (1–5 microns). The porosity was interconnected, and the compacts were 30–40% porous (bulk density 3.2–2.7 mg/mm$^3$) depending on the reaction sintering temperature and time. Grain size and porosity were uniform throughout the compact, except for the presence of a small number of large voids.

Reaction sintered material was exposed under the following conditions:

(a) Exposure to molten aluminium at 1000° C. for up to 1000 hours.
(b) Exposure to molten aluminium and cryolite at 1000° C. for 24 hours.
(c) Cathodic polarization in a pool of molten aluminium under cryolite at 1000° C. for 10 hours.
(d) Cathodic polarization in a drained configuration for 120 hours at 1000° C.
(e) Exposure to aluminium and cryolite in the cathode pad of a commercial aluminium cell for four weeks at 970° C.

In all these tests the reaction sintered TiB$_2$ materials according to this invention showed a performance superior to the commercially prepared TiB$_2$ specimens. In particular, the grain boundary attack was absent and no cracking, reaction, or disintegration was observed. On the other hand, the reaction sintered specimens which contained an excess of incompletely reacted components, showed drastic grain boundary attack and sample disintegration.

EXAMPLE 7

A powder batch was prepared for each of the reactions (13), (14), (15) and (16) by mixing titanium dioxide (rutile) and carbon black in stoichiometric proportions according to the above-mentioned equations. The batch weights are given in Table 3. Four 2.5 cm diameter pellets were prepared for each batch by cold pressing at 67 MPa for 2 minutes. The pellets were heat-treated in vacuum (less than 2 Pa pressure) at 1600° C. for 2 hours. Sub-oxides were produced as determined by x-ray diffraction and shown in Table 3.

Ti$_2$O$_3$ appeared in all the samples. It was a single phase for reaction scheme (14) and in mixture with desired sub-oxide phases in reaction schemes (13) and (15). In reaction scheme (16) Ti$_2$O was not produced

EXAMPLE 8

A Ti$_2$O$_3$ pellet made in Example 7 according to reaction scheme (14) was ground and mixed with B$_4$C and carbon black in stoichiometric proportions to produce TiB$_2$ in accordance with reaction scheme 9.

The batching weights were Ti$_2$O$_3$, 3.60 g; B$_4$C, 1.38 g; C, 0.60 g; 20M carbowax binder, 0.2 g.

A 2.5 cm diameter disc was cold pressed at 67 MPa for 3 minutes. The pellet was heat treated in vacuum at less than 2 Pa pressure at 1350° C. for 2 hours. The x-ray diffraction analysis of the product shown TiB$_2$ with a trace of alumina contamination from the grinding media.

Differential thermal analysis of the precursor powder showed that there were no intermediate reaction steps taking place below 1200° C. at a heating rate of 10° C. per minute.

The reaction sintered disc had a microstructure including a fine sponge-like structure of titanium diboride grains less than 1 micron in diameter.

We claim:
1. A shaped refractory article of group IV b, V b, or VI b metal boride, which article has a microstructure with a weight average grain diameter of from 0.5 to 5 microns and substantially no grains larger than 10 microns diameter, from 10% to 45% by volume being made up of interconnected pores the majority having a diameter not substantially greater than 5 microns, porosity and grain size being substantially uniform throughout the microstructure, the article containing not more than about 0.2% by weight of oxygen and not more than about 0.5% by weight of carbon.

2. A shaped refractory article as claimed in claim 1, wherein the metal boride is titanium diboride.

3. A shaped refractory article as claimed in claim 2, having a density of from 2.5 to 4.0 mg/mm$^3$.

4. A shaped refractory composite of an inert particulate material in a matrix of a group IV b, V b, or VI b metal boride, which matrix has a microstructure with a weight average grain diameter of from 0.5 to 5 microns and substantially no grains larger than 10 microns diameter, from 10 to 45% by volume being made up of interconnected pores of which the majority have a diameter not substantially greater than 5 microns, porosity and a grain size being substantially uniform throughout the microstructure, the matrix containing not more than about 0.2% by weight of oxygen and not more than about 0.5% by weight of carbon.

5. A shaped refractory composite as claimed in claim 4, wherein the inert particulate material is TiB$_2$, Al$_2$O$_3$, AlON or AlN, and the metal boride of the matrix is titanium diboride.

6. A method of making a shaped refractory article of a group IV b, V b, or VI b metal boride, or a refractory shaped composite of an inert particulate material in a matrix of the metal boride, which method comprises forming a uniformly mixed body of reactants containing the said metal as an oxide sub-oxide, borate or carbide, boron as an element, oxide or carbide, and if necessary carbon in the stoichiometric proportions desired to form the desired metal boride, boron suboxides and carbon monoxide, forming the reaction mixture optionally together with an inert particulate material into a shaped compact, and heating the shaped compact in an inert atmosphere to form a reaction sintered product.

7. A method as claimed in claim 6, wherein the uniformly mixed body of reactants is formed by precipitating one reactant on to a dispersion of another reactant and drying the mixture.

8. A method as claimed in claim 6, wherein the uniformly mixed body of reactants is formed by co-precipitating two or more of the reactants and drying the mixture.

9. A method as claimed in claim 6, wherein the metal boride is $TiB_2$.

10. A method as claimed in claim 9, wherein the reaction mixture is formed by providing one or more of the reactants as a dispersion in an aqueous solution of a titanium halide and precipitating the titanium values on to the one or more dispersed reactants and drying the mixture and heating to convert the titanium values to $TiO_2$.

11. A method as claimed in claim 10, wherein the titanium halide is titanium tetrachloride.

12. A method as claimed in claim 9, wherein the uniformly mixed body of reactants is formed by pre-heating a comminuted mixture of 2 molar parts of $TiO_2$, substantially one molar part of $B_4C$ and substantially 3 atomic parts of C in vacuum or inert atmosphere to a temperature at which CO is evolved but below that at which $TiB_2$ is formed, and then cooling and grinding the mixture.

13. A method as claimed in claim 9, wherein the uniformly mixed body of reactants is formed by pre-heating a comminuted mixture of $TiO_2$ and C to produce an intermediate product consisting essentially of one or more titanium sub-oxides, and grinding and mixing the intermediate product with $B_4C$ and C in the proportions required to produce $TiB_2$ and CO.

14. A method as claimed in claim 12, wherein the comminuted mixture is pre-heated at a temperature not greater than 650° C.

15. A method as claimed in claim 9, wherein the uniformly mixed body of reactants is heated at a temperature of at least 1300° C. for a time to effect essentially complete formation of the $TiB_2$ and evolution of CO.

16. A method as claimed in claim 6, wherein the metal boride matrix has a microstructure with a weight average grain diameter of from 0.5 to 5 microns and substantially no grains larger than 10 microns diameter, from 10 to 45% by volume being made up of interconnected pores of which the majority have a diameter not substantially greater than 5 microns, porosity and a grain size being substantially uniform throughout the microstructure, the matrix containing not more than about 0.2% by weight of oxygen and not more than about 0.5 by weight of carbon.

17. A method as claimed in claim 7, wherein the metal boride is $TiB_2$.

18. A method as claimed in claim 8, wherein the metal boride is $TiB_2$.

* * * * *